Patented May 31, 1949

2,471,438

UNITED STATES PATENT OFFICE 2,471,438

PROCESS OF MAKING A FURFURYL ALCOHOL RESIN

Purnal L. McWhorter, Jr., Odessa, Del., assignor to Haveg Corporation, Newark, Del., a corporation of Delaware No Drawing. Application March 2, 1946, Serial No. 651,673

9 Claims. (Cl. 260—67)

The present invention relates to a novel and advantageous process for the production of an initial, fusible, soluble condensation product from furfuryl alcohol-containing materials selected from the group consisting of furfuryl alcohol and mixtures of furfuryl alcohol and not more than about 15% furfural, and to the resulting product. More particularly, the invention relates to the preparation of the product described by a process in which the acid condensation of the furfuryl alcohol-containing material is accurately controlled so that the dangers of a too violent or explosive reaction are avoided. Since the same problems are present in the acid condensation of furfuryl alcohol and of mixtures of furfuryl alcohol and not more than about 15% furfural, the discussion of the problems and the description of the invention will be directed to the use of furfuryl alcohol as the starting material.

Heretofore, various processes have been suggested for the production of resins by the acid condensation of furfuryl alcohol, both by the use of strong acids and of weak acids.

It had been found that in order to initiate the condensation reaction at a relatively low temperature, the use of a relatively large amount of a strong acid was required. The use of such an amount of strong acid is hazardous, however, due to the violence of the reaction and the tendency for spontaneous conversion of the initial condensation product into the infusible, insoluble condition. For example, relatively concentrated sulphuric acid, when added drop-by-drop to furfuryl alcohol, causes conversion of the furfuryl alcohol into the infusible, insoluble resin around the acid drops. Furthermore, when a solution of sulphuric acid in an amount required for the reaction is mixed with furfuryl alcohol, sufficient heat is developed to result in a very violent reaction which not only is uncontrollable but will reach explosive conditions unless great care is taken and may even result in the substantial conversion of the entire product. In the case weak acids are employed, difficulties are often encountered in obtaining the necessary pH for a satisfactory reaction and a higher temperature is required for the initiation of the reaction than is the case when strong acids are used. Due to the larger amounts of weak acids and the higher temperature of reaction initiation, the difficulties described in controlling the reaction are also encountered when a weak acid is employed.

These difficulties, particularly the violent nature of the reaction which has been encountered, have retarded the commercialization of furfuryl alcohol resins in spite of the known superior hardness, toughness, and chemical resistance of the resin in its final state of conversion, as compared to most heat-converted resins.

Another disadvantage of the prior processes is the non-homogeneous character of the initial resin, as is shown by the "grainy" or "mushy" appearance of the initial fluid resin upon standing. The non-homogeneous character of the product is caused by the fact that, in the prior processes, there is an uneven reaction, portions of the furfuryl alcohol being more reacted than other portions.

One object of the present invention is to provide a process for the production of a fusible, soluble, furfuryl alcohol condensation product by which the difficulties heretofore encountered in the acid condensation of furfuryl alcohol may be avoided and a product of the desired degree of condensation or polymerization readily obtained.

A further object of the present invention is to provide a process for the acid condensation of furfuryl alcohol which is controllable to provide an initial condensation product, convertible into an infusible, insoluble product characterized by hardness, toughness, and chemical resistance.

Another object of the invention is to provide a process for the production of a substantially homogeneous fusible, soluble, furfuryl alcohol condensation product, as distinguished from the prior products which are heterogeneous in composition.

Other objects, including the provision of an initial, soluble furfuryl alcohol condensation product of novel properties, will be apparent from a consideration of this specification and the claims.

Hereinafter, the reaction involved in the conversion of the furfuryl alcohol into the initial convertible product will be termed a condensation reaction in view of the fact that water of condensation is liberated as the reaction proceeds. It is to be understood, however, that the term is used broadly to refer to the conversion of the furfuryl alcohol into products of the desired extent of reaction, which conversion may involve polymerization as well as condensation.

The process of the present invention is characterized by the fact that the portion of the condensation reaction which is highly exothermic is carried out, as distinguished from prior processes, by the release of the stored or potential energy of the system at a predetermined, controllable rate. In prior processes, the stored or potential energy of the system was not released at a controllable rate, but rather in surges and, in order to keep the reaction in bounds, various extraneous factors had to be carefully controlled, for example the temperature of the furfuryl alcohol had to be controlled by cooling. In the process of the present invention, the reaction is not controlled by these extraneous factors but by the control of the rate of the release of the energy of the system itself. Thus, in the present process, there is no time lag in the reaction and the condensation reaction is directly responsive to the acid addition, that is to say, the exothermicity of the reaction is utilized as fast as the acid is added. Furthermore, in the method of the invention, the released energy, as the reaction proceeds, is utilized to convert water of condensation into steam and thereby to effect the removal of water from the system.

In accordance with the present invention, the factors of the temperature of the furfuryl alcohol to which the acid is added, and the amount of acid added at any given time are correlated so that the condensation reaction proceeds immediately at a predetermined rate and without sudden release of energy in the system. As will hereinafter appear, acid is added to the furfuryl alcohol heated to a temperature above about 85° C. and the fact that this is possible is indeed surprising in view of the known dangers involved in the condensation of furfuryl alcohol.

The acid referred to in the preceding paragraph is the acid which is in excess of that required to overcome or neutralize any added or natural buffer material present in the furfuryl alcohol. Most commercial furfuryl alcohol products contain such a buffer material and, even freshly distilled furfuryl alcohol, after standing, appears to develop a buffer material. Until the buffer material is overcome, the rate of acid addition is immaterial, and the process of the invention and the amounts of acid added will be described with regard to furfuryl alcohol in which any buffer originally present has been overcome, referred to hereafter as "buffer-free" furfuryl alcohol.

The amount of acid required to neutralize the buffer material may be readily determined since, until the buffer material is overcome, no significant amount of exothermic heat will be developed. In practice, this may most readily be determined by taking a small amount of the furfuryl alcohol and heating it to the temperature at which the main reaction is to be initiated. Acid is then added to the heated sample until the liberation of appreciable exothermic heat is noted. From the amount of acid added to the sample, the amount required to neutralize the main batch is calculated and an amount just short of this amount, as a matter of safety, may be added rapidly and stirred into the heated furfuryl alcohol. In order to provide a further margin of safety, the laboratory test may, if desired, be carried out at a temperature a few degrees higher than the temperature at which the main reaction is to be initiated, for example the sample may be tested at 100° C., while the main reaction may be initiated at 96° C. While the buffer is advantageously neutralized at the temperature at which the reaction is to be initiated, it may, if desired, be neutralized at room or any intermediate temperature.

The process of the present invention in the preferred embodiment thereof is divisible into a number of stages (not including the neutralization of the buffer) as follows: (a) the addition of acid to buffer-free hot furfuryl alcohol in an amount to initiate and continue the reaction to establish a boiling point of the reacting mixture; (b) the continuation of the reaction, while the furfuryl alcohol-water mixture is boiling, until the condensation reaction has progressed to the desired point; (c) the removal of the acid from the system; and (d) the distillation of the product to obtain a substantially anhydrous intial resin.

Before considering each of the various stages, the type of acid which may be employed will be discussed. Preferably, a strong mineral or organic acid, such as sulphuric, hydrochloric, hydrobromic, benzene sulphonic, or other acids having a comparable ionization constant will be used throughout the process, for, in such case, the temperature of the furfuryl alcohol to which the acid is added can be considerably lower and the total amount of acid considerably less than when a weaker acid is employed. Of the acids available for use, sulphuric acid is preferred. Referring to the weaker acids, these may be employed, if desired, although, as stated, their use will entail certain disadvantages. Typical of the weak acids are phosphoric, oxalic, and maleic acids. It is also to be understood that, if desired, mixtures of acids or different acids or acids of different ionization constants may be used in the process but no advantage is to be gained thereby.

The acid is advantageously added in aqueous solution, and the concentration of the solution may be as high as desired so long as it is below that which will result in local conversion of the resin and, in most instances, this difficulty can be avoided by vigorous agitation of the furfuryl alcohol at the time of the addition of the acid. In the case of weak acids, it is possible, if desired, to add them directly, and without dissolution, to the furfuryl alcohol. Preferably, in the case of strong acids, such as sulphuric, a solution of a concentration of about 5% to about 20% will be employed, especially satisfactory results being obtained with a solution of a concentration of about 10%.

Referring to the first stage of the process, namely, the establishment of the boiling point, acid is added to hot, undiluted, buffer-free furfuryl alcohol. The temperature of the furfuryl alcohol is sufficient so that upon the addition of the acid, the condensation reaction will be initiated immediately. The temperature, however, will not be sufficiently high so that the exothermic heat liberated by the reaction will raise the boiling point of the reaction mixture above about 160° C. It will, therefore, be seen that there is a definite relation between the temperature of the hot furfuryl alcohol and the amount of acid added; in other words, the temperature of the furfuryl alcohol and the amount of acid are correlated to initiate and continue the condensation of the furfuryl alcohol, to establish a boiling point of the reacting mixture, by the liberation of exothermic heat, below about 160° C.

The temperature to which the furfuryl alcohol is heated is dependent to some extent on the strength of the acid but in any event is higher than about 85° C. In the case of strong acids, the furfuryl alcohol is advantageously heated to a temperature of between about 90° C. and about 125° C., preferably between 90° C. and 100° C. In the case of weak acids, it will usually be necessary to heat the furfuryl alcohol to a somewhat higher temperature than that usable in the case of strong acids, for example, when maleic or other acid of a comparable ionization constant is employed, it may be necessary to heat the furfuryl alcohol to a temperature in the neighborhood of 140° C. In each case, however, no difficulty will be presented in determining the correlation between the temperature and the amount of the particular acid required to initiate and continue the reaction without raising the temperature to a boiling point above about 160° C.

In view of the advantages in the use of a strong acid, the invention will be hereinafter described with specific reference to the use of such an acid, but it is to be understood that the description, except for the specific figures given, is also applicable to the use of a weak acid.

In view of the fact that the vapor pressure of the furfuryl alcohol increases with increase of temperature, the establishment of a boiling point at a relatively low temperature is recommended. Thus, in the preferred embodiment of the invention, a strong acid is employed and the temperature of the buffer-free furfuryl alcohol and the amount of strong acid added are correlated so that a boiling point not above about 135° C., advantageously not above about 125° C., is established. The amount of acid added in the first stage will depend on the temperature of the furfuryl alcohol and with higher temperatures, the amount employed will be smaller than at lower temperatures.

Usually, it will be desirable to add the acid in the first stage in a number of increments and in such case, the first addition or additions of acid initiates the reaction and the subsequent additions continue the condensation reaction to the point where sufficient water of condensation has been liberated to establish a boiling point of the furfuryl alcohol-water mixture at the desired point. The rate of reaction will be responsive to rate of acid addition and in no case will the amount added raise the temperature to a point above 160° C.

During the addition of the acid in the first stage, as well as during the subsequent additions hereinafter described, the furfuryl alcohol is advantageously vigorously agitated in order that the acid, immediately upon contact with the furfuryl alcohol, will be uniformly distributed therethrough. Vigorous agitation is also advantageously provided during the neutralization of the buffer, if the furfuryl alcohol employed is not buffer-free.

With reference to the establishment of the boiling point, it is to be noted that the boiling point may be established at any temperature desired between about 103° C., and a temperature approaching the boiling point of the furfuryl alcohol depending on the amount of water which is permitted to accumulate in the mixture before boiling takes place. A relatively high boiling point means that a small amount of water is present and a relatively low boiling point means that the water content of the furfuryl alcohol-water mixture is relatively high. During the reaction, after the boiling point has been established, the water of condensation is liberated substantially at the rate at which the water is vaporized so that the boiling point of the furfuryl alcohol-water mixture is maintained within a narrow range, although as the water of condensation is vaporized, the boiling point may increase slightly, for example 5 to 10 degrees. While, at a relatively high boiling point, the amount of water which will be removed during the reaction is greater than at a lower boiling point, the amount of furfuryl alcohol vaporized will be increased and, for this reason, in any particular case, these factors are taken into consideration and a boiling point intermediate in range will usually be preferred.

The boiling point may be established solely by the addition of acid or it may be established by the addition of acid accompanied by cooling of the reacting mixture by suitable means, for example cooling coils. In either event, the acid is added to raise the temperature to a point approaching the boiling point desired. If the furfuryl alcohol is heated to a temperature below about 103° C., at least sufficient acid is added to bring the temperature above this figure and, as stated, the amount of acid added in this stage will not be sufficient to raise the temperature to a point above about 160° C. Preferably, the acid is added to establish a boiling point between about 104° C. and about 135° C., advantageously between about 105° C. or 107° C. and 125° C. When a boiling temperature in the lower part of the preferred range, for example 105° C. to 110° C. is established, it is advisable to cool the reacting mixture following the addition or additions of the acid, but in the preferred embodiment, the boiling point is established solely by the addition of the acid and a boiling point in the range of about 115° C. to about 125° C., for example, about 121° C., is preferred. Such temperatures afford a reaction rate which is sufficient to remove the major portion of the water of reaction, for example, 90% or more, during the reaction, but is insufficient to vaporize excessive quantities of the furfuryl alcohol.

Until the furfuryl alcohol-water mixture boils, care must be exercised in the addition of the acid so that the acid at no time is in excess of the amount which will provide a controllable reaction, and for this reason, it will be desirable to add the acid in small increments while watching the temperature of the reacting mixture, although, if desired, the acid can be added continuously after the operation has been standardized.

When the boiling point is to be established solely by the addition of acid, the acid is added at a rate so that the temperature will rise gradually to the boiling point of the furfuryl alcohol-water mixture. This may be advantageously accomplished by the addition of acid to maintain a steady rise of temperature in the reacting mixture, for example, the amount may be added at the rate to provide a temperature rise of one degree centigrade per minute.

In the case the boiling point is to be established by the addition of acid accompanied by cooling, the acid may be added gradually until a temperature in the neighborhood of the boiling point desired is reached and is thereafter added at a rate so that the exothermicity of the reaction and the cooling will be balanced to maintain a temperature at or near that corresponding to the boiling point desired. Preferably in this case, a boiling point below about 135° C., for example, below about 110° C. is established, so that the acid is added in a sufficient amount to initiate the reaction and to raise the temperature of the reacting mixture to the desired temperature, followed by further additions of acid and cooling until sufficient water has been accumulated to provide the desired boiling point.

After the boiling point has been established, with or without cooling, a lower boiling point, if desirable for any reason, may be established by interrupting the progress of the reaction and the boiling, for example, by cooling the reacting mixture to a point where it no longer boils. Water of condensation will accumulate in the system and a lower boiling point may, therefore, be established. Usually, but not necessarily, a further addition of acid is made to raise the temperature of the mixture to its new and lower boiling point and cooling may be used, if desired, in establishing the new boiling point.

In the second stage of the process in which the furfuryl alcohol-water mixture is boiled and the condensation reaction completed, acid is added in an amount to maintain vigorous boiling of the mixture, and the rate of addition is immaterial so long as the amount added does not cause the reacting mixture to foam excessively. At lower boiling temperatures, more acid is required to keep the reaction mixture boiling than when the mixture is boiling at a higher temperature and more acid can be added at lower boiling temperatures without excessive foam formation than at higher boiling temperatures. It will, therefore, be seen that the amount of acid in this stage is not critical so long as the reaction mixture is maintained in a boiling condition, but in any of the cases, there is an excess of acid so that unless the acid is removed, the reaction product would be converted to the insoluble, infusible resin during the distillation.

The reacting mixture is boiled until the condensation has progressed to the point where the desired degree of condensation is obtained, that is until the furfuryl alcohol has been condensed to provide a product having the extent of reaction desired, as may be determined by one familiar with the art, for example, by visual observation or by the determination of the viscosity of the product. During the boiling of the reacting mixture, water is being liberated and, as stated, 90% or more of the water of condensation may be removed by the process. In any event, the reaction is not conducted to the gelatinization stage and the reaction is stopped at the desired point by the removal from the reaction mixture of the acid present therein (the third stage of the process), thereby forming a non-reactive initial resinous product.

The removal of the acid is advantageously accomplished by neutralization of the acid, for example by the addition, to the hot or cooled reaction product, of a solution of a suitable base, such as caustic soda or potash or soda ash and the like. If desired, however, the reaction product may be washed with sufficient water to remove the acid or to reduce the acid content to a point where, from a practical standpoint, the effect of its presence is negligible. In the preferred embodiment, the reaction product, upon competion of the reaction, is cooled to just below the boiling point and is then neutralized by the addition, with vigorous agitation, of a solution of a base. This has the advantage that the addition of the base will not cause the excessive foaming that might be encountered if the base were to be added to the boiling mixture and, at the same time, the heat of the reaction product is not lost and thus a saving is effected in the subsequent distillation step.

In the last step of this process, the reaction product, after the removal of the acid, is distilled to remove the small portion of water remaining in the product. This is advantageously accomplished by heating the reaction product at atmospheric pressure while still in the reacting vessel and before the reaction product has cooled appreciably. The distillation is preferably continued until the product reaches a temperature of about 145° C., at which point it will be found that substantially all of the water has been removed. If desired, however, the distillation can be conducted in a separate vessel after the product has cooled. Furthermore, the distillation can be conducted under vacuum, for example 20 to 30 inches of mercury, until the substantially anhydrous product is obtained.

The furfuryl alcohol vaporized during the condensation reaction and any short chain products removed from the initial resin by the distillation step may be recovered and utilized in a subsequent process.

The total amount of strong acid added in the process, after the buffer has been neutralized depends on the temperature at which the furfuryl alcohol-water mixture boils at the end of the reaction, that is just before the removal of the acid from the system, and in any case the total acid employed is sufficient to provide an initial resin of the desired degree of condensation. Thus, with a relatively high temperature, a very small amount of acid is used whereas with a lower temperature, a larger, but still a very small amount, will be employed. Since the amount of acid varies with the temperature, the pH likewise varies and with a high temperature the pH will be higher than it will be at a lower temperature. For example, in the case where furfuryl alcohol-water mixture boils at the end of the reaction at about 130° C., the total amount of acid used after neutralization of the buffer, may be .006% by weight calculated as 100% sulphuric acid and based on the weight of the furfuryl alcohol. When the furfuryl alcohol-water mixture boils at the end of the reaction at about 108° C., the total amount of acid, used after neutralization of the buffer, may be .030% on the aforesaid basis. It will, therefore, be seen that the amount of acid required in the process of the present invention is substantially less than that necessary in the prior processes.

After the preparation of the non-reactive initial resin, it may be rendered reactive and used in the production of molded or laminated products in accordance with standard procedures employed in the resin industry. The non-reactive resin is made reactive and convertible into the final, infusible, insoluble stage by the addition thereto of an acidic material or a material which liberates acid under the conditions of the curing step. These materials are preferably strong acids or materials capable of liberating strong acids, so that a substantially condensed and polymerized infusible and insoluble resin with optimum properties will be obtained. Advantageously, a latent catalyst capable of liberating a strong acid is employed, such as is described and claimed in the copending application of William H. Adams, Jr., and Hans H. Lebach, Serial No. 565,808, filed November 29, 1944. The conversion of the initial resin to the final, infusible, insoluble stage is preferably accomplished by use of heat.

The following examples are illustrative of the process of the present invention, Example I being typical of the process where the boiling point is established solely by the acid additions and Example II being typical of the process where the boiling point is established by the acid additions and cooling:

*Example I*

A charge of 2,000 pounds of furfuryl alcohol was placed in a cylindrical tank and heated to 94° C. When this temperature was reached, 4,500 c. c. of 10% sulphuric acid solution was added over a period of four minutes while the furfuryl alcohol was vigorously stirred (which was also the case during the subsequent additions of acid). There was a two degree rise in temperature during the addition of the acid. Three additional 100 c. c. increments of the acid were added during the next five minutes with no rise in temperature. Then 100 c. c. of the acid were added after two minutes with an increase in temperature of one degree. At this point, the buffer had been substantially neutralized. Then 100 c. c. of the acid were added after two minutes and the temperature rose to 100° C. in three minutes and the condensation reaction was initiated. At that time, 50 c. c. of the acid were added and the temperature rose to 122° C. in twenty-five minutes and the mixture boiled at that temperature. No further additions were made for thirty-five minutes, whereupon 100 c. c. of the acid were added, and thereafter, the following additions were made to maintain boiling in a range between 119° C. to 122° C.: after twenty-five minutes—100 c. c. of the acid; after an additional thirty minutes—50 c. c. of the acid; after an additional thirty-eight minutes—100 c. c. of acid; after sixty-six additional minutes—50 c. c. of the acid; and after ten minutes more—50 c. c. of the acid. The mixture was then reacted for another thirty-nine minutes while the mixture boiled within the range stated. The mixture was then cooled to 110° C. and neutralized by the addition of 1,100 c. c. of solution containing 451 grams of sodium hydroxide while the mixture was vigorously agitated. At least 95% of the water of condensation was removed by the boiling of the reacting product. The mixture was then distilled in the tank at atmospheric pressure until it boiled at 145° C. which required about twenty-five minutes. The substantially anhydrous resin was cooled and then discharged from the tank into drums.

In this example, the tank in which the reaction was carried out was provided with means by which a sample of the reacting mixture was constantly pumped from the bottom of the tank through a cup and returned to the tank at a higher level. This made it possible to follow the reaction and to measure the viscosity from time to time. The boiling was stopped when a sample showed a viscosity of 73.2 centipoises at 113.5 (the temperature of the sample in the cup). The distilled resin after being poured into drums and allowed to cool had a viscosity of 500,000 centipoises at 25° C.

*Example II*

A charge of 2,000 pounds of furfuryl alcohol was placed in a tank and heated to 96.3° C. Then 5,100 c. c. of 10% sulphuric acid were added over a period of ten minutes while the furfuryl alcohol was vigorously stirred, the stirring being continued throughout the subsequent additions of acid and alkali. The temperature rose to 100.6° C., showing that the buffer had been neutralized and the reaction initiated. Two minutes later, another 100 c. c. of the acid were added and the temperature rose to 107.6° C. at which point the reacting mixture was cooled by means of cooling coils to 105.5° C. Then 100 c. c. of the acid were added and three minutes later the temperature had risen to 109.2° C. and the material was cooled to 102° C. 300 c. c. of the acid were added over a period of nine minutes and the temperature rose to 105.8° C. in three minutes and the material was cooled to 104.9° C. Then 200 c. c. of the acid were added and in three minutes the temperature rose to 106.5° and the material was cooled to 105° C. One minute later, 100 c. c. of the acid were added and the temperature rose to 106.4° C. after two minutes and the material was cooled to 105.5° C. One minute later, 100 c. c. of the acid were added with a rise in temperature after two minutes to 106.2° C. and the material was then cooled to 103.5° C. During the next four minutes, 300 c. c. of the acid were added, and after four minutes the temperature rose to 107° C. and the furfuryl alcohol-water mixture boiled. It will be seen that the procedure described built up a sufficient water content in the furfuryl alcohol so that the mixture boiled at the relatively low temperature of 107° C. In order to maintain the boiling in the range between 106.3° C. and 107.3° C., the following additions of the acid were made: after one minute—100 c. c.; five minutes later—100 c. c.; five minutes later—100 c. c.; five minutes later—100 c. c.; four minutes later—100 c. c.; three minutes later—100 c. c.; three minutes later—100 c. c.; and four minutes later—100 c. c. After the last addition of the acid, the mixture was allowed to react for thirty-four minutes at which time it was determined that the condensation reaction had progressed to the desired stage. This was determined by dippinng a strip of metal into the reaction product, chilling the metal with the initial resin adhering thereto by immersing it in cold water and observing the characteristics of the chilled resinous product (a procedure similar to that used in testing jellies). The reacting mixture was then cooled a few degrees and neutralized by the addition of 1,420 c. c. of solution containing 582 gms. of caustic soda. The material was then heated in tthe tank and distilled at atmospheric pressure until the product boiled at 145° C. which required fifty-five minutes. The substantially anhydrous resin was then discharged from the tank into drums and allowed to cool. The product had a viscosity of 870,000 centipoises at 25° C.

It will be noted that a longer time was required in the distillation step in this example than in the previous example and this was due to the fact that in this example, the material during the condensation reaction boiled at a lower temperature and, therefore, there was more water to be removed by distillation.

From the foregoing description, it will be seen that the process of the present invention possesses several important and outstanding advantages as compared to prior processes. It has been pointed out that, during the portion of the process in which the reaction is highly exothermic, stored or potential energy in the system is released at a predetermined controllable rate and there is, therefore, no time lag in the reaction, the condensation reaction being directly responsive to the acid addition. This provides a process which is much easier to control and the danger of a too violent or explosive reaction present in prior process is avoided, with the result that it can be operated successfully by an operator who has not been technically trained. Furthermore, more efficient control of the end point is thereby possible, both from the standpoint of reaction rate and constant low water content from batch to batch.

In addition, the total amount of catalyst required is lower than the minimum amount required in prior methods. This is obviously an advantage since there is a saving in acid and there is less acid to be removed. For example, when the acid is neutralized, the amount of caustic soda or other alkali required is reduced, with a corresponding reduction in the contamination of the resin by the salt formed as the result of the neutralization. Since in accordance with the process, it is unnecessary to supply heat to the reaction at any time between the time of the addition of the acid and the time of the removal thereof from the initial resin, the heating surfaces do not become coated with infusible material as the result of local overheating of resin containing the catalyst, a difficulty present in certain of the prior processes. Another feature of importance is the saving in distillation costs possible by the present method due to the fact that during the process the reaction mixture is boiled and at least the major portion of the water of condensation is removed during the reaction.

Another advantage resides in the fact that a higher efficiency of resin recovery is possible by the method of the present invention and for the same reason the resins produced are superior in several respects as compared to resins produced by prior methods. It has been observed that all the way through the condensation and polymerization of the furfuryl alcohol, the reaction rate is greater in the less highly condensed constituents than in those which have progressed further toward the final product. By the method hereindescribed, there is present at any time after the reaction begins only a small excess of catalyst, and, therefore, only the most highly reactive ingredients are affected. The process, therefore, can be visualized as one in which the polymerization progresses more nearly in definite steps than would be the case if there were a large excess of catalyst present. As evidence of this, there may be cited the fact that the initial resin is homogeneous and free from significant "graininess." There is also a decided reduction in the ratio of cold to hot viscosity of the initial resins of the present invention as compared to those previously prepared which indicates a more homogeneous composition. The practical benefit of this last-mentioned characteristic is that resins of desirable characteristics are sufficiently fluid when cold to be conveniently poured and handled which is not the case with resin made by previous methods and which have been reacted to substantially the same degree of polymerization. It will thus be seen that, irrespective of the theory, the resins obtained by the process possess superior characteristics.

As stated at the outset, if desired for economic or other reasons, furfural in a limited amount may be included with the furfuryl alcohol reacted to form the initial resin, but so far as the process or the properties of the product are concerned, there is no advantage to be gained. If furfural is included with the furfuryl alcohol, it may be present in amounts up to about 15% without deleteriously affecting the properties of the product. The conditions of reaction and the like described herein for the preparation of a product from furfuryl alcohol are applicable for mixtures of furfuryl alcohol and up to about 15% furfural.

In the foregoing description, it has been stated that there are four stages of the process and, while this is true of the preferred embodiment, it is not necessary to remove the acid, in which case, the resin will be reactive and will not be substantially anhydrous. Furthermore, if a non-reactive resin which is not subtsantially anhydrous is desired, the distillation step may be omitted. It will, therefore, be seen that the important steps are the initiation and continuation of the reaction to establish a boiling point, and the continuation of the reaction while the mixture is boiling until the condensation reaction has progressed to the desired extent. Considerable modification is possible in the various steps of the process without departing from the essential features of the invention.

I claim:

1. In the process of producing an initial, resinous condensation product in which a furfuryl alcohol-containing material selected from the group consisting of furfuryl alcohol and mixtures of furfuryl alcohol and not more than 15% furfural is condensed by acid and heat, the steps which comprise adding a portion of the acid to said furfuryl alcohol-containing material heated to a temperature not appreciably less than 85° C. and below the boiling point of the furfuryl alcohol-containing material, said material being buffer-free and of insufficient acidity to cause liberation of appreciable exothermic heat at said temperature; controlling the amount of acid added and the temperature of the reaction mixture to initiate and continue the condensation of said furfuryl alcohol-containing material with the accompanying liberation of exothermic heat and to establish a boiling point of the reaction mixture below 160° C. by said exothermic heat; reacting the mixture in a boiling condition below 160° C.; and adding the remainder of said acid to continue the reaction mixture in a boiling condition below 160° C. to obtain the initial, resinous condensation product.

2. In the process of producing an initial, resinous condensation product in which a furfuryl alcohol-containing material selected from the group consisting of furfuryl alcohol and mixtures of furfuryl alcohol and not more than 15% furfural is condensed by acid and heat, the steps which comprise adding a portion of the acid to said furfuryl alcohol-containing material heated to a temperature not appreciably less than 90° C. and not appreciably greater than 125° C.; said material being buffer-free and of insufficient acidity to cause liberation of appreciable exothermic heat at said temperature; controlling the amount of acid added and the temperature of the reaction mixture to initiate and continue the condensation of said furfuryl alcohol-containing material with the accompanying liberation of exothermic heat and to establish a boiling point of the reaction mixture not appreciably above 135° C. by said exothermic heat; reacting the mixture in a boiling condition below 160° C.; and adding the remainder of said acid to continue the reaction mixture at a boiling condition below 160° C. to obtain the initial, resinous condensation product.

3. The process of claim 2 in which the amount of acid added to the heated furfuryl alcohol-containing material and the temperature of the reaction mixture are controlled to initiate and continue the condensation of said furfuryl alcohol material and to establish the boling point of the reaction mixture solely by the addition of said acid.

4. The process of claim 3 wherein the furfuryl alcohol-containing material is furfuryl alcohol; wherein the temperature of the furfuryl alcohol to which the acid is added is between 90° C. and 100° C.; wherein the acid added to initiate and continue the reaction establishes a boiling point of the reacting mixture at a temperature between 105° C. and 125° C.; and wherein the reaction mixture is boiled and the reaction is continued in a boiling condition after the addition of the remainder of the acid at a temperature below 135° C.

5. The process of claim 2 in which the amount of acid added to the heated furfuryl alcohol-containing material and the temperature of the reaction mixture are controlled to initiate and continue the condensation of said furfuryl alcohol-containing material and to establish the boiling point of the reaction mixture by the addition of said acid and by cooling of the reacting mixture.

6. The process of claim 5 wherein the furfuryl alcohol-containing material is furfuryl alcohol; wherein the temperature of the furfuryl alcohol to which the acid is added is between 90° C. and 100° C.; wherein the acid added to initiate the reaction raises the temperature of the furfuryl alcohol to not more than 110° C.; wherein the acid added to continue the reaction together with the cooling establishes the boiling point of the reaction mixture at a temperature between 105° C. and 110° C.; and wherein the reaction mixture is allowed to boil and the reaction is continued in a boiling condition after the addition of the remainder of the acid at a temperature below 135° C.

7. In the process of producing an initial, resinous condensation product in which a furfuryl alcohol-containing material selected from the group consisting of furfuryl alcohol and mixtures of furfuryl alcohol and not more than 15% furfural is condensed by acid and heat, the steps which comprise adding a portion of the acid to said furfuryl alcohol-containing material heated to a temperature not appreciably less than 90° C. and not appreciably greater than 125° C., said material being buffer-free and of insufficient acidity to cause liberation of appreciable exothermic heat at said temperature; controlling the amount of acid added and the temperature of the reaction mixture to initiate and continue the condensation of said furfuryl alcohol-containing material with the accompanying liberation of exothermic heat and to establish a boiling point of the reaction mixture not appreciably above 135° C. by said exothermic heat; reacting the mixture in a boiling condition below 160° C., the said boiling condition being provided by the exothermic heat liberated by the condensation reaction; and adding the remainder of said acid to continue the reaction mixture in a boiling condition below 160° C. due to the liberation of the exothermic heat of the condensation reaction and to obtain an initial, resinous condensation product.

8. The process of claim 7 in which the amount of acid added to the heated furfuryl alcohol-containing material and the temperature of the reaction mixture are controlled to initiate and continue the condensation of said furfuryl alcohol material and to establish the boiling point of the reaction mixture solely by the addition of said acid.

9. The process of claim 7 in which the amount of acid added to the heated furfuryl alcohol-containing material and the temperature of the reaction mixture are controlled to initiate and continue the condensation of said furfuryl alcohol-containing material and to establish the boiling point of the reaction mixture by the addition of said acid and by cooling of the reacting mixture.

PURNAL L. McWHORTER, Jr.

REFERENCES CITED

The following references are of record in the file of this patent:

UNITED STATES PATENTS

| Number | Name | Date |
|---|---|---|
| 1,665,235 | Trickey | Apr. 10, 1928 |
| 2,343,973 | Harvey | Mar. 14, 1944 |
| 2,345,966 | Fiedler | Apr. 4, 1944 |
| 2,399,055 | Nordlander | Apr. 23, 1946 |